W. P. Hoffman,
Window Shutter,

№ 68,076. Patented Aug. 27, 1867.

Witnesses:
H. P. Lathrop
C. W. M. Smith

Inventor:
Wm. P. Hoffman

United States Patent Office.

WILLIAM PITT HOFFMAN, OF SAN FRANCISCO, CALIFORNIA.

Letters Patent No. 68,076, dated August 27, 1867.

---

IMPROVEMENT IN WINDOW-BLINDS.

---

The Schedule referred to in these Letters Patent and making part of the same.

---

TO ALL WHOM IT MAY CONCERN:

Be it known that I, WILLIAM PITT HOFFMAN, of San Francisco, county of San Francisco, State of California, have invented a new and improved "Window-Blind and Anti-Duster" for railway cars and dwellings; and I do hereby declare the following description and accompanying drawings are sufficient to enable any person skilled in the art or science to which it most nearly appertains to make and use my said invention or improvement without further invention or experiment.

The object of my invention is to provide an improved window-blind and anti-duster, which may be either transparent or opaque, but which, while allowing free access to the air, will effectually prevent the passage of all dust, and is especially adapted to be used on railroad cars. To effect my object I provide a window-frame of any suitable construction, and having the space ordinarily occupied by plain glazing filled with V-shaped troughs, extending from side to side, and partially filled with water, supplied from above so as to intercept and absorb the dust, while the air is allowed to enter the car or building, fresh and cool from its passage over the water. To more fully explain and illustrate my invention, reference is had to the accompanying drawing, forming a part of this specification, of which—

Figure 1:
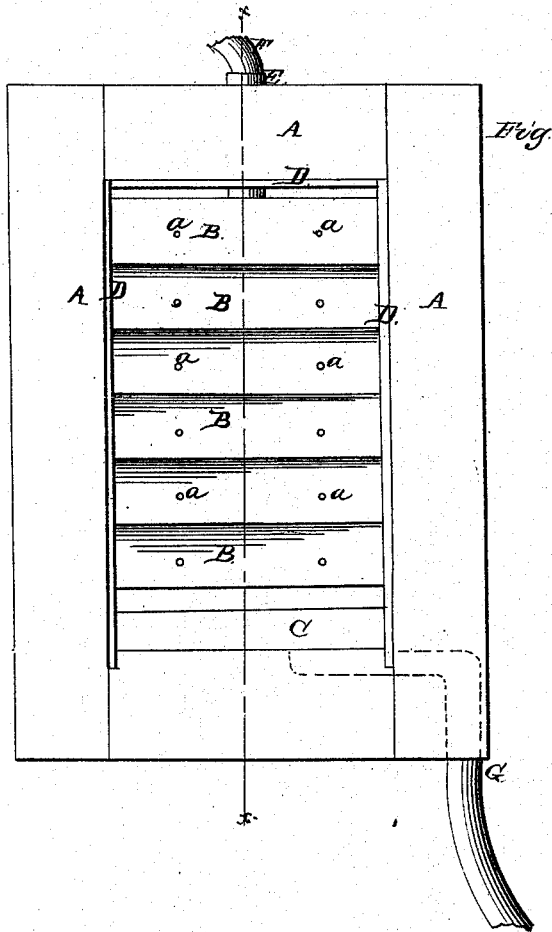

Figure 1 is a front view of the blind.

Figure 2:
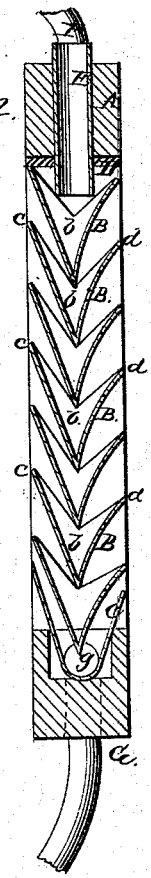

Figure 2, a side sectional elevation, taken through $x\ x$, fig. 1.

Figure 3:
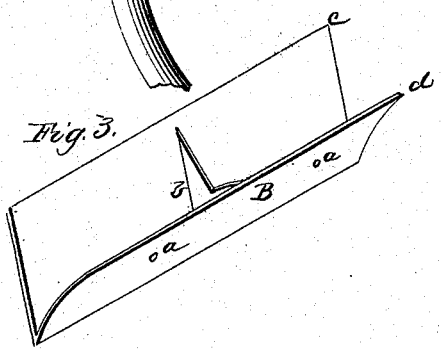

Figure 3 is a perspective view of one trough, showing a partition.

Similar letters indicate like parts in each of the drawings.

A is a window-frame, which may be constructed of wood in the ordinary way. B B are V-shaped troughs, extending across the interior space of the frame, and so placed that the apex of each trough extends a sufficient distance down into the trough below. These troughs are higher on the inside $c$ than the outside $d$, so that the water with which they are to be supplied shall never flow over and wet them on that side. The water may be brought to the upper trough by a flexible or telescopic tube, F, passing through the pipe E in the upper sash, and conveyed away from the lower one in the same manner through the pipe G, the object of this being to allow the blind to be raised or lowered when desired. Through the front or outside of each trough are pierced two or more small holes, $a\ a$, at such a height as to allow the surplus water from each trough to run into the next lower one, and at the same time to wash off the dust which may collect on the surface. This front is also made slightly concave, so that as the dust strikes against the face, it will be thrown downward into the water and absorbed, while the air passes through the space between the bottom of the trough and the surface of the water in the one below, entirely freed from dust, and cooled by its contact with the water. The water is constantly changed in each trough, running at last into the lower one, C, from which it is conveyed away through G by the opening $g$, shown in fig. 2. $b\ b$ are partitions across each trough, to prevent the water from all running to one end in ascending or descending a grade, and may be one or more to each trough, as may be found necessary. D D are rubber or other linings to the inside of each frame, against which the ends of the troughs are pressed sufficiently hard to make them water-tight. The troughs are intended to be made of glass for transparent windows, or they may be made opaque for shades, and of any suitable material.

Having thus described my invention, what I claim, and desire to secure by Letters Patent, is—

The window-blind and anti-duster, composed of frame A, V-shaped troughs B B, with straight or concave sides, and having the openings $a\ a$, the partitions $b\ b$, and tubes E G, the latter for the purpose of filling and emptying the troughs, substantially as and for the purpose set forth.

In witness whereof I have hereunto set my hand and seal.

WM. P. HOFFMAN. [L. S.]

Witnesses:
H. P. LATHROP,
C. W. M. SMITH.